United States Patent [19]
Van Hoogenbemt

[11] Patent Number: 6,111,899
[45] Date of Patent: Aug. 29, 2000

[54] INTERFACING DEVICE TO REPLACE M SETS OF BITS OUT OF N SETS OF BITS, CONTROL UNIT AND LOGICAL CELL

[75] Inventor: Stefaan Margriet Albert Van Hoogenbemt, Mechelen, Belgium

[73] Assignee: Alcatel, Paris, France

[21] Appl. No.: 09/027,667

[22] Filed: Feb. 23, 1998

[30] Foreign Application Priority Data

Feb. 28, 1997 [EP] European Pat. Off. ............. 97400470

[51] Int. Cl.<sup>7</sup> .............................. H04J 3/02; G06F 13/38
[52] U.S. Cl. ......................... 370/540; 710/127; 327/407
[58] Field of Search ............................ 710/127; 370/529, 370/537, 540, 546; 327/407; 326/104

[56] References Cited

U.S. PATENT DOCUMENTS

| | | | |
|---|---|---|---|
| 4,085,447 | 4/1978 | Pertl et al. ............................... | 364/900 |
| 4,309,754 | 1/1982 | Dinwiddie, Jr. ........................ | 364/200 |
| 4,520,439 | 5/1985 | Liepa ...................................... | 364/200 |
| 5,272,703 | 12/1993 | Peters ..................................... | 370/102 |

FOREIGN PATENT DOCUMENTS

| | | |
|---|---|---|
| 0552384 | 7/1993 | European Pat. Off. . |
| 0600683 | 6/1994 | European Pat. Off. . |
| 0752800 | 1/1997 | European Pat. Off. . |

OTHER PUBLICATIONS

"Packet Switching and Frame Relay in a Broadband Network", L. Jenkins, *Alcatel Telecommunications Review*, 2nd Quarter 1996, pp. 138–143.

*Primary Examiner*—Joseph L. Felber

[57] ABSTRACT

An interfacing device (INT) which replaces M outgoing sets of bits out of N outgoing sets of bits (OS1, OS2, ..., OSN) by M incoming sets of bits (IS1, IS2, ..., ISM), M being smaller than N, includes:

a. an outgoing register (OR) wherein the N outgoing sets of bits (OS1, OS2, ..., OSN) are temporarily stored; and b. a selection means (SEL) comprising a multiplexer bank (MUX) with N multiplexers (MUX1, MUX2, ..., MUXN) each having one output and at most M inputs whereto at most M incoming sets of bits are applied, and a control unit (CTRL) for the multiplexer bank (MUX). The control unit (CTRL) can control the multiplexers (MUX1, MUX2, ..., MUXN) so that an appropriate order is respected by the outgoing sets of bits (OS1, OS2, ..., OSN).

6 Claims, 3 Drawing Sheets

|  CS | ENIJ,DISI | | | |
|---|---|---|---|---|
| | 0 0 | 0 1 | 1 1 | 1 0 |
| CB 0 | 0 | 0 | 0 | 0 |
| 1 | 0 | 0 | 0 | 1 |

Fig. 3

| DISI+1 | ENIJ,DISI | | | |
|---|---|---|---|---|
| | 0 0 | 0 1 | 1 1 | 1 0 |
| CB 0 | 0 | 1 | 1 | 0 |
| 1 | 0 | 1 | 1 | 1 |

INTERFACING DEVICE TO REPLACE M SETS OF BITS OUT OF N SETS OF BITS, CONTROL UNIT AND LOGICAL CELL

BACKGROUND OF THE INVENTION

1. Technical Field

The present invention relates to an interfacing device for interfacing bit-parallel data buses of different bit width, a control unit of the interfacing device, and a logical cell for use in such a control unit.

2. Discussion of Related Art

Such an interfacing device is already known in the art, e.g. from the U.S. Pat. No. 4,309,754, entitled 'Data interface mechanism for interfacing bit-parallel data buses of different bit width'.

Therein (cf. Col. 1, ln. 39–45), an interface mechanism is described which includes register means, named a data register, and a selection means, called a selector circuitry and which interconnects a first data bus with a second data bus the first one being wider than the second one. In the direction from the wide to the narrow data bus, the selector circuitry is then used for connecting different portions of the data register to the narrower data bus, one at a time, in an appropriate sequence.

Such an interfacing device is useful in particular when several data handling units are connected to the ingoing side of the interfacing device, and different ones of these data handling units deliver only a portion of the data leaving simultaneously at the outgoing side of the device. This is for instance so when the outgoing sets of data bits are ATM (Asynchronous Transfer Mode) cell headers containing routing information only a portion of which is determined by for instance a RAM (random access memory).

The selector circuitry described in U.S. Pat. No. 4,309,754 is drawn in FIG. 1 of the aforementioned U.S. Patent and consists of a microprocessor, control program storage means, a direct memory access controller, an interrupt controller, a dual port storage memory means, and some other means. The selector circuitry hence is very complex in hardware.

Summary of Invention

It is an object of the present invention to realize an interfacing device of the above known type, but wherein the hardware complexity of the selection means is reduced significantly.

According to a first aspect of the invention, an interfacing device (INT) to be coupled between an incoming channel (IC) and an outgoing channel (OC) and to be used to replace M outgoing sets of bits out of N outgoing sets of bits (OS1, OS2, . . . , OSN) by M incoming sets of bits (IS1, IS2, . . . , ISM) received on said incoming channel (IC), M being an integer number smaller than N, said interfacing device (INT) comprising:

a. outgoing register means (OR) provided to temporarily store said N outgoing sets of bits (OS1, OS2, . . . , OSN); and b. selection means (SEL) coupled between said incoming channel (IC) and said outgoing register means (OR), and provided to select said M outgoing sets of bits out of said N outgoing sets of bits (OS1, OS2, . . . , OSN) and to route said M incoming sets of bits (IS1, IS2, . . . , ISM) to said outgoing register means (OR) to thereby replace said M outgoing sets of, is characterized in that said selection means (SEL) further comprises:

c. a multiplexing unit (MUX) including N multiplexers (MUX1, MUX2, . . . , MUXN), each multiplexer being related to an outgoing set of bits of said N outgoing sets of bits (OS1, OS2, . . . , OSN), and having a control input, at most M input terminals adapted to sink at most M incoming sets of bits out of said M incoming sets of bits (IS1, IS2, . . . , ISM), and one output terminal adapted to source one of said at most M incoming sets of bits under control of a control signal applied to said control input if said related outgoing set of bits has to be replaced; and d. a control unit (CTRL) adapted to generate for said each multiplexer, said control signal and to apply said control signal via an output terminal of said control unit (CTRL) to said control input of said each multiplexer.

Indeed, when realizing the selection means only by a bank of multiplexers and a control unit, the hardware complexity is reduced significantly. Since the chip surface required to implement a multiplexer grows exponentially with the number of inputs and number of outputs thereof, a selection means with a bank of multiplexers, each having at most M inputs and one output furthermore is less complex in hardware than a selection means consisting of only one multiplexers having M inputs and N outputs. As will be seen later, the control unit for generating the control signals for the bank of multiplexers, can be realized with low hardware requirements.

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B.

Similarly, it is to be noted that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

In further accord with the first aspect of the invention, the interfacing device is characterized in that a multiplexer with index i amongst said N multiplexers (MUX1, MUX2, . . . , MUXN) is equipped with:

i input terminals if said index i has a value in the range from 1 to M, said i input terminals being adapted to respectively sink incoming sets of bits with indices 1 to i amongst said M incoming sets of bits (IS1, IS2, . . . , ISM);

M input terminals if said index i has a value in the range of M+1 to N−M, said M input terminals being adapted to respectively sink said M incoming sets of bits (IS1, IS2, . . . , ISM); and N−i+1 input terminals if said index i has a value in the range of N−M+1 to N, said N−i+1 input terminals being adapted to respectively sink incoming sets of bits with indices M−N+i to M amongst said M incoming sets of bits (IS1, IS2, . . . , ISM).

In this way, the order of the incoming sets of bits may be respected in the sequence of outgoing sets of bits. This may be useful, as is indicated in Col. 1, ln. 44 of U.S. Pat. No. 4,309,754. By applying the incoming sets of bits to the multiplexers as defined according to the first aspect of the invention, the outgoing sets of bits may be replaced by incoming sets of bits so that subsequent incoming sets of bits do not change order when passing through the interfacing device and thus become subsequent outgoing sets of bits, eventually interleaved by some outgoing sets of bits which were not replaced by incoming sets of bits.

In still further accord with the first aspect of the present invention, the interfacing device is characterized in that said control unit (CTRL) comprises a matrix of identical logical cells ($C_{1,1}$; . . . ; $C_{N,M}$), each logical cell being associated with one multiplexer of said N multiplexers (MUX1, MUX2, . . . , MUXN) and with one input terminal of said at most M input terminals of said one multiplexer, and being adapted to generate a control signal indicating whether said output terminal of said one multiplexer has to source an incoming set of bits sunk by said one input terminal or not.

Indeed, by constructing the control unit as a matrix of identical logical cells, the hardware complexity is even more reduced since the control unit is then realized by repeating a simple logical cell structure.

A particular embodiment of the interfacing device according to the first aspect of the present invention wherein the control unit is constructed of a matrix of logical cells is defined in that each logical cell is equipped with three input terminals (CB, DISI, ENIJ) and two output terminals (CS, DISI+1) whereof:

a first input terminal (CB) is adapted to sink a signal indicating whether an outgoing set of bits related to said one multiplexer has to be replaced by one of said M incoming sets of bits (IS1, IS2, . . . , ISM);

a second input terminal (DISI) is adapted to sink a signal indicating that an output terminal of another multiplexer than said one multiplexer has to source an incoming set of bits sunk by said one input terminal;

a third input terminal (ENIJ) is adapted to sink a signal indicating that said output terminal of said one multiplexer does not have to source an incoming set of bits sunk by another input terminal than said one input terminal;

a first output terminal (CS) is adapted to source said control signal; and a second output terminal (DISI+1) is adapted to source a signal indicating that said output terminal of said one multiplexer or said another multiplexer sources said incoming set of bits sunk by said one input terminal.

BRIEF DESCRIPTION

In accord with a second aspect of the invention, a logical cell ($C_{i,j}$) to be used in a control unit (CTRL) of an interfacing device (INT) which replaces M outgoing sets of bits out of N outgoing sets of bits (OS1, OS2, . . . , OSN) by M incoming sets of bits (IS1, IS2, . . . , ISM), M being an integer number smaller than N, said logical cell ($C_{i,j}$) being adapted to generate a control signal for an associated multiplexer in said interfacing device (INT) with at most M input terminals adapted to sink at most M incoming sets of bits of said M incoming sets of bits (IS1, IS2, . . . , ISM), said logical cell ($C_{i,j}$) being associated with one input terminal of said at most M input terminals and said control signal indicating whether an output terminal of said associated multiplexer has to source an incoming set of bits sunk by said one input terminal or not, said logical cell ($C_{i,j}$) being equipped with three input terminals (CB, DISI, ENIJ) and two output terminals (CS, DISI+1) whereof:

a first input terminal (CB) is adapted to sink a signal indicating whether an outgoing set of bits related to said associated multiplexer as to be replaced by one of said M incoming sets of bits (IS1, IS2, . . . , ISM);

a second input terminal (DISI) is adapted to sink a signal indicating that an output terminal of another multiplexer than said associated multiplexer has to source an incoming set of bits sunk by said one input terminal;

a third input terminal (ENIJ) is adapted to sink a signal indicating that said output terminal of said associated multiplexer does not have to source an incoming set of bits sunk by another input terminal than said one input terminal;

a first output terminal (CS) is adapted to source said control signal; and a second output terminal (DISI+1) is adapted to source a signal indicating that said output terminal of said associated multiplexer or said another multiplexer sources said incoming set of bits sunk by said one input terminal.

In acord with a third aspect of the invention, a control unit (CTRL) used to generate a control signal for each multiplexer of N multiplexers (MUX1, MUX2, . . . , MUXN) in an interfacing device (INT) which replaces M outgoing sets of bits out of N outgoing sets of bits (OS1, OS2, . . . , OSN) by M incoming sets of bits (IS1, IS2, . . . , ISM), M being an integer number smaller than N, said each multiplexer having at most M input terminals adapted to sink at most M incoming sets of bits of said M incoming sets of bits (IS1, IS2, . . . , ISM), said control unit (CTRL) comprising a matrix of logical cells ($C_{i,j}$; . . . ; $C_{N,M}$), each logiclal cell ($C_{i,j}$) being associated with one multiplexer of said N multiplexers (MUX1, MUX2, . . . , MUXN) and with one input terminal of said at most M input terminals of said one multiplexer, and adapted to generate a control signal indicating whether an output terminal of said one multiplexer has to source an incoming set of bits sunk by said one input terminal or not, said each logical cell ($C_{i,j}$) being equipped with three input terminals (CB, DISI, ENIJ) and two output terminals (CS, DISI+1) whereof:

a first input terminal (CB) is adapted to sink a signal indicating whether an outgoing set of bits related to said one multiplexer has to be replaced by one of said M incoming sets of bits (IS1, IS2, . . . , ISM);

a second input terminal (DISI) is adapted to sink a signal indicating that an output terminal of another multiplexer than said one multiplexer has to source said incoming set of bits sunk by said one input terminal;

a third input terminal (ENIJ) is adapted to sink a signal indicating that said output terminal of said one multiplexer does not have to source an incoming set of bits sunk by another input terminal than said one input terminal;

a first output terminal (CS) is adapted to source said control signal; and a second output terminal (DISI+1) is adapted to source a signal indication that said output terminal of said one multiplexer or said another multiplexer sources said incoming set of bits sunk by said one input terminal.

The above mentioned and other objects and features of the invention will become more apparent and the invention itself will be best understood by referring to the following description of an embodiment taken in conjunction with the accompanying drawings wherein:

FIG. 3 is a digital state diagram, illustrating the value of a first outgoing signal CS of the logical cell $C_{i,j}$ drawn in FIG. 2, in function of the input signals CB, ENIJ and DISI; and FIG. 4 is a digital state diagram, illustrating the value of a second outgoing signal DISI+1 of the logical cell $C_{i,j}$ drawn in FIG. 2, in function of the input signals CB, ENIJ and DISI.

DETAILED DESCRIPTION OF PREFERRED EMBODIMENTS

Figure 1:
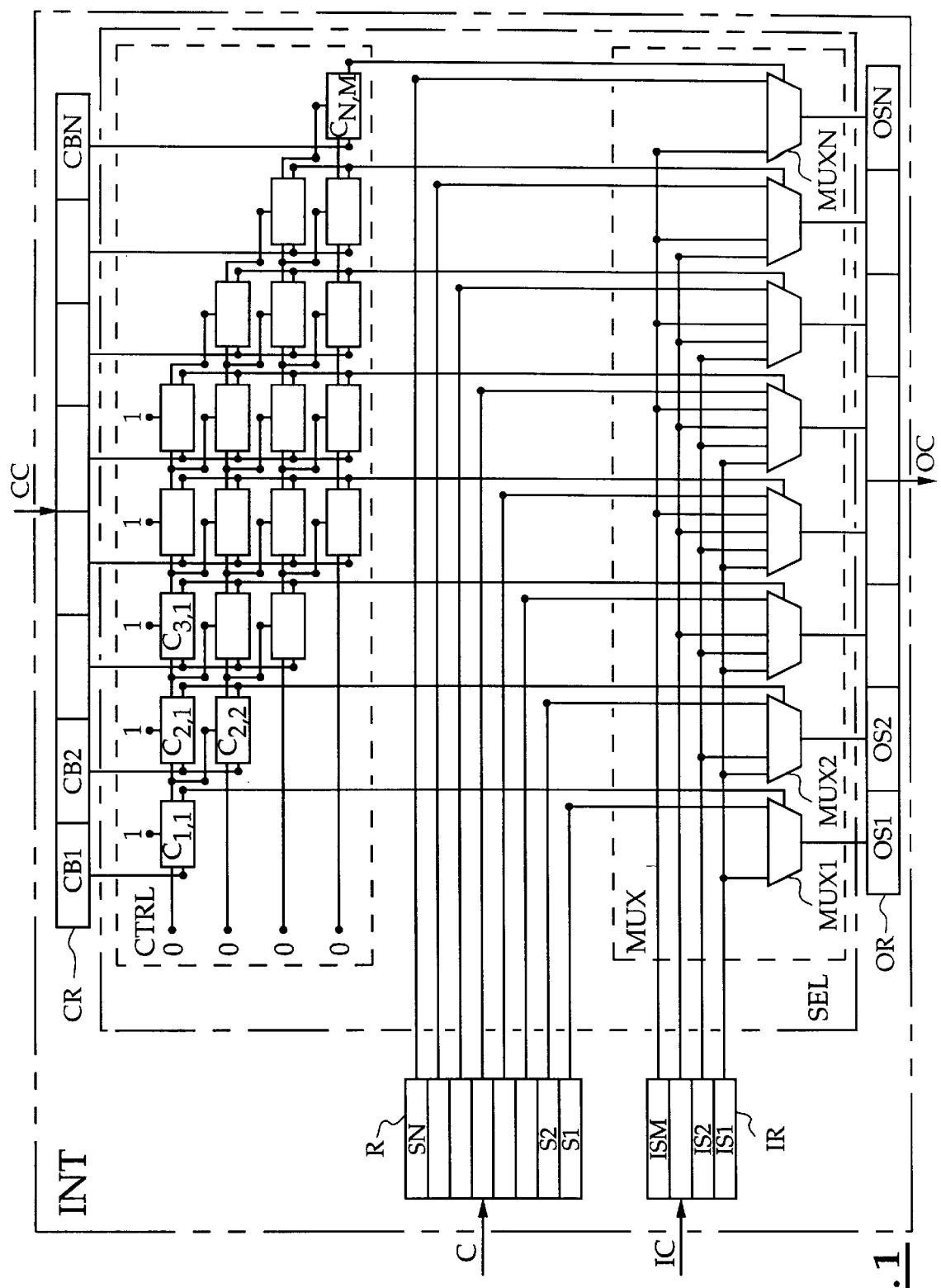
FIG. 1 represents a block scheme of an embodiment of the interfacing device INT according to the present invention.

The interface device INT of FIG. 1 performs a processing step called ATM (Asynchronous Transfer Mode) cell header expansion. For some applications, the 32 bit long ATM cell header (ATM header without the redundant error correction information) is reduced to a shorter sequence of bits. To address a RAM (random access memory) for instance, it is recommended to use short addresses since short addresses allow quick access to memory cells of the RAM. An interface device which reduces the ATM cell header to an address with length 16 bits is described in the U.S. patent application U.S. Ser. No. 09/028,264 with the same filing date as this case, from the same applicant, and entitled 'Interfacing Device to Extract M Sets of Bits out of N Sets of Bits, Control Unit and Logical Cell' and claiming priority from European Application No. 97400464 filed Feb. 28, 1997 and which U.S. application is hereby incorporated by reference for background. The 16 bit long sequence serves as an address for the just mentioned RAM which produces on input of a 16 bit incoming address a 16 bit outgoing address. This outgoing address has to replace the 16 bit in the original ATM cell header that were extracted by the device described in the just mentioned co-pending application. An embodiment of the interface device according to the present invention, which performs this replacement, is drawn in FIG. 1. The following paragraphs are dedicated to a detailed description of the working of the interface device INT which expands the 16 bit long sequence at the output of the RAM applied to its input into a 32 bit long ATM cell header wherein the order of the bits is not changed from the order of the bits in the 16 bit long sequence.

The interface device INT is coupled between an incoming channel IC and an outgoing channel OC. These channels, IC and OC, may be parallel or serial busses. The interface device INT is equipped with a register R, an incoming register IR, a selection means SEL and an outgoing register OR. In the register R, N memory cells, S1, S2, ..., SN, each having the capacity to store 4 bits, are associated with N output terminals. The N output terminals constitute a parallel output port for the register R. In the incoming register IR, M memory cells, IS1, IS2, ..., ISM, each having the capacity to store 4 bits, are associated with M of the output terminals, respectively where M is less than N. The M output terminals constitute a parallel output port for the incoming register IR. The selection means SEL on the other hand is provided with a control register CR and a matrix of logical cells $C_{1,1}$, $C_{2,1}$, $C_{2,2}$, $C_{3,1}$, ..., $C_{N,M}$, which constitute a control unit CTRL for a multiplexer bank MUX also included in the selection means SEL. The multiplexer bank MUX contains N multiplexers, MUX1, MUX2, ..., MUXN, with one output terminal each. The multiplexer bank furthermore is equipped with a parallel, M-wide input port, a parallel, N-wide input port, and a parallel, N-wide output port. The last component of the interface device INT, the outgoing register OR, has N memory cells OS1, OS2, ..., OSN, which, similarly to the memory cells of the incoming register IR, have a capacity to store 4 bits. Each memory cell of the outgoing register OR is associated with an input terminal of the outgoing register OR, and these input terminals constitute a parallel input port for the outgoing register OR.

Inside the interfacing device INT, the incoming channel IC is connected to an input terminal of the incoming register IR and the outgoing channel OC is connected to an output terminal of the outgoing register OR. A channel C is coupled to an input terminal of the register R. This channel C is an external channel, i.e. a serial or parallel bus which enters the interface device INT. The parallel output port of the register R is coupled to the parallel, N-wide input port of the multiplexer bank MUX, the parallel output port of the incoming register IR is coupled to the parallel, M-wide input port of the multiplexer bank MUX, and the parallel output port of this multiplexer bank MUX is coupled to the parallel input port of the outgoing register OR. Outputs of the logical cells in one and the same column of the matrix constitute one output terminal of the control unit CTRL, and each output terminal of the control unit CTRL is linked to a corresponding control input of a corresponding multiplexer in the multiplexer bank MUX. In the control unit CTRL, a control channel CC is coupled to an input of the control register CR which includes N memory locations CB1, CB2, ..., CBN each having the capacity to store 1 bit and each having associated an output terminal of the control register CR. The control channel CC is an external channel, i.e. a serial or parallel bus which enters the interface device INT. Each logical cell in the matrix is equipped with three inputs and two outputs. A first input of a logical cell $C_{i,j}$ in column i and row j of the matrix is connected to the output terminal of the control register CR associated with a memory location CBi. A second input terminal of the logical cell $C_{i,j}$ is interconnected with a second output terminal of the preceding logical cell $C_{i-1,j}$ in the some row, except for the first logical cell in each row whose second input terminal is always kept low. A third input terminal to the logical cell $C_{i,j}$ is interconnected with the second output terminal of the logical cell $C_{i-1,j-1}$ in the preceding row and preceding column, except for the first logical cell $C_{i,1}$ in each column whose third input terminal is always kept high. The first output terminals of all logical cells in a single column are interconnected and constitute, as already described above, a single output terminal for the control unit CTRL. The second output terminals of the logical cells in the matrix are coupled to second and third input terminals of logical cells in subsequent columns and rows in a way already described in this paragraph.

In the multiplexer bank MUX, terminal 1 of the parallel, N-wide input port is connected to an input of multiplexer MUX1, terminal 2 of the parallel, N-wide input port is connected to an input of multiplexer MUX2, and so on. Besides these terminals, each multiplexer, MUX1, MUX2, ..., MUXN, is provided with at most M terminals interconnected with terminals of the parallel, M-wide input port of the multiplexer bank MUX. Terminal 1 of this parallel, M-wide input port is connected to an input terminal of the multiplexers MUX1 to MUXN–M+1, terminal 2 of this parallel, M-wide input port is connected to an input terminal of multiplexers MUX2 to MUXN–M+2, and so on. This means that one needs a multiplexer bank MUX wherein each multiplexer MUX1 has the following number of inputs connected to the parallel, M-wide input port of MUX:

for i=1 to M: i input terminals connected to the parallel, m-wide input port MUX for i=M+1 to N–M: M input terminals connected to the parallel, m-wide input port MUX for i=N–M+1 to N: N–i+1 input terminals connected to the parallel, m-wide input MUX.

Herein, i is the integer index number of the multiplexer MUXi in the multiplexer bank MUX.

It is further noticed that in FIG. 1, N equals 8 and M equals 4 so that the interface device INT is capable of replacing 4×4 bits in a sequence of 8×4 bits or, in other words, is able to expand the ATM cell header length from 16 to 32. In the following paragraphs describing the working of the interface device INT, a set of 4 consecutive bits in the incoming address length from 16 bits to 32 bits in the ATM cell header will be called a 'nibble'. The interface device INT hence replaces 4 out of 8 nibbles in an ATM cell header.

Via the channel C, an ATM cell header comprising 8 nibbles is applied to the register R to be stored in the 8 memory cells S1, S2, . . . , SN. Four of the 8 nibbles in this ATM cell header have to be replaced by nibbles which are applied to the interfacing device INT via the incoming channel IC. These nibbles are temporarily stored in the memory cells IS1, IS2, . . . , ISM, also in the order wherein they arrive. The incoming nibbles fill the memory cells S1, S2, . . . , SN in the order wherein they arrive at the register R. Simultaneously with the ATM cell header arrival at R, a sequence of 8 control bits enters the control register CR via the control channel CC and the 8 control bits are stored in memory locations CB1, CB2, . . . , CBN respectively. The 8 control bits indicate which nibbles of the 8 ATM cell header nibbles have to be replaced by incoming nibbles IS1, IS2, . . . , ISM in the incoming channel IC. If for instance control bit CB2 is high, the second nibble of the ATM cell header, i.e. the nibble stored in location S2 of R, is to be replaced. Obviously, this implies that 4 control bits of the 8 incoming control bits, CB1, CB2, . . . , CBN, have a high value and 4 of them have a low value. The nibbles that have to be routed to the outgoing channel OC, i.e. either the ATM cell header nibbles stored in R or the replacement nibbles stored in IR, pass via one of the multiplexers MUX1, MUX2, . . . , MUXN, to the outgoing register OR to be temporarily stored in one of the 8 memory cells OS1, OS2, . . . , OSN) before being applied to the outgoing channel OC. The outgoing nibbles are applied to the outgoing channel OC in the order of the memory cells OS1, OS2, . . . , OSN wherein they are stored. Since the interfacing device INT outputs nibbles in the order wherein they arrive, a nibble stored in a lower memory cell of the incoming register IR also has to be stored in a lower memory cell of the outgoing register OR. This is realized by the multiplexer bank MUX under control of the control signals generated by the logical cells in the matrix of the control unit CTRL, as will be explained here after.

Via the parallel bus between the incoming register IR and multiplexer bank MUX, nibble IS1 is applied to an input terminal of MUX1, nibbles IS1 and IS2 are applied to input terminals of MUX2, nibbles IS1 to IS3 are applied to input terminals of MUX3, nibbles IS1 to IS4 are applied to input terminals of MUX4 and MUX5, nibbles IS2 to IS4 are applied to input terminals of MUX6, nibbles IS3 and IS4 are applied to input terminals of MUX7, and nibble IS4 is applied to an input terminal of MUX8 (MUXN in FIG. 1). In this way, any combination of 4 nibbles out of the 8 ATM cell header nibbles can be replaced by the incoming nibbles in the incoming register IR without change in order. Suppose for instance that in the control register CR the control bits CB1, CB2, CB6 and CB8 are high while control bits CB3, CB4, CB5 and CB7 are low. Then, MUX1 has to route nibble IS1 from its first input terminal to its output terminal, MUX2 has to route nibble IS2 from its second input terminal to its output terminal, MUX3 has to route the ATM cell header nibble S3 from its input terminal coupled to an output of R to its output terminal, MUX4 has to route the ATM cell header nibble S4 from its input terminal coupled to an output of R to its output terminal, MUX5 has to route the ATM cell header nibble S5 from its input coupled to R to its output terminal, MUX6 has to route nibble IS3 from its second input terminal to its output terminal, MUX7 has to route ATM cell header nibble S7 from its input terminal coupled to an output of R to its output terminal, and MUX8 has to route nibble IS4 from its first input terminal to its output terminal. The memory cells OS1 to OS8 of the outgoing register OR in this way become filled with nibbles IS1, IS2, S3, S4, S5, IS3, S7 and IS4 respectively. Consequently the right nibbles are applied in the right order to the outgoing channel OC.

The logical cells $C_{1,1}, \ldots, C_{N,M}$ in the control unit CTRL generate the control signals for MUX1 to MUX8 to enable these multiplexers to respectively select the correct input terminal to be connected to their respective output terminals. Each logical cell $C_{i,j}$ thereto generates a signal indicating for multiplexer i whether it has to select its j'th input terminal or not. In other words, each logical cell $C_{i,j}$ is associated with a multiplexer MUXi an input terminal j of this multiplexer MUXi which is interconnected with a terminal of the M wide parallel input port of MUX. If none of the input terminals has to be selected, the multiplexer MUXi automatically routes the ATM cell header nibble applied to its last input terminal and coming from the register R, to its output terminal. Logical cell $C_{i,j}$ hence generates a signal for multiplexer MUXi indicating that input terminal j has to be selected when a control bit CBi corresponding to the outgoing nibble OSi is high, when the nibble applied to input j of MUXi is not yet selected by a multiplexers with an index below i, and when MUXi does not yet have to select a nibble applied to one of its input terminals with a lower index than j. The control bit CBi corresponding to the outgoing nibble OSi is applied to the first input terminal of $C_{i,j}$. If the nibble applied to input j of MUXi is already selected by a multiplexer with an index below i, this is told to $C_{i,j}$ via its second input terminal which receives information from cell $C_{i-1,j}$. If this information is a low bit, the nibble is not yet selected. Similarly, if the multiplexer MUXi already has to select a nibble applied to one of its input terminals with a lower index than j, this is told to $C_{i,j}$ via its third input terminal which receives information from cell $C_{i-1,j-1}$. If this information is a high bit, MUXi does not have to select a nibble applied to one of the other terminals. Apparently, logical cell $C_{i,j}$ also has to generate information at its second output terminal that has to be used by logical cells $C_{i+1,j+1}$ and $C_{i,j+1}$. A logical cell $C_{i,j}$ able to generate the above described output signals from the three input signals is drawn in FIG. 2. The value of the outputted signals as a function of the value of the three ingoing signals is illustrated by the diagrams of FIG. 3 and FIG. 4 respectively.

Figure 2:
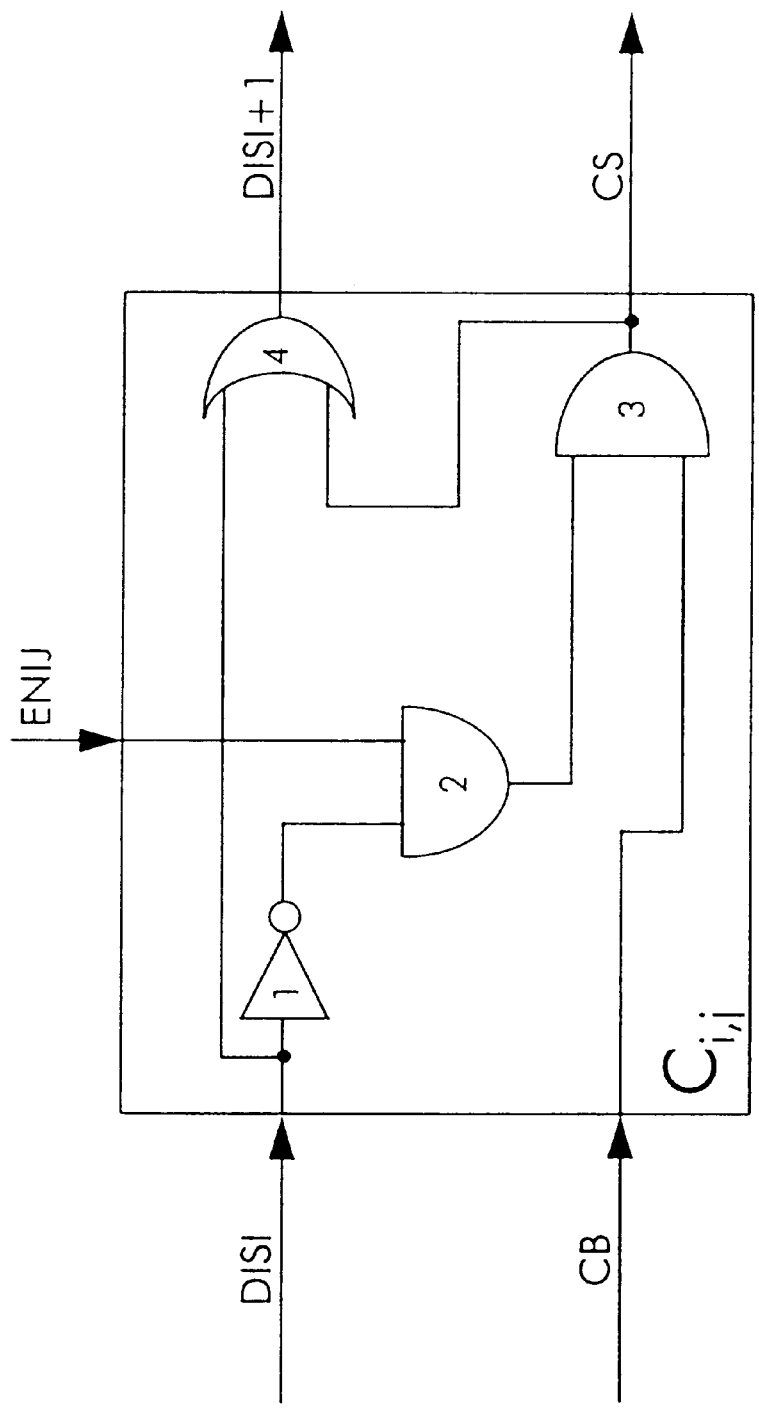
FIG. 2 represents a scheme of an embodiment of the logical cell $C_{i,j}$ according to the present invention.

FIG. 2 shows a logical cell $C_{i,j}$ which includes a NOT port 1, a first AND port 2, a second AND port 3, and a NOR port 4. The logical cell $C_{i,j}$ further has a first input CB, a second input DISI a third input ENIJ, a first output CS and a second output DISI+1.

The first input CB is connected to a first input of the second AND port 3. The second input DISI is connected to an input of the NOT port 1 and a second input of the NOR port 4. The third input ENIJ is connected to a first input of the first AND port 2 and an output of this first AND port 2 is connected to a second input of the second AND port 3. This second AND port 3 has an output interconnected with a first input of the NOR port 4 and the first output CS of the logical cell $C_{i,j}$. The output of the NOT port 1 is connected to a second input of the first AND port 2 and the NOR port 1 has an output terminal connected to the second output DISI+1 of the logical cell $C_{i,j}$.

As already explained above, the signal generated at the first output CS indicates that the corresponding multiplexer MUXi has to select its j'th input terminal when both the signals at the first and third input terminals, CB and ENIJ, are high and when the signal at the second input terminal DISI of the logical cell $C_{i,j}$ is low. This is also seen from FIG. 3 and hence the first output signal can be expressed as follows:

$$CS = CB.ENIJ.\overline{DISI}$$

A person skilled in the art of designing digital logic will recognize that this first output signal is generated at the output terminal CS in FIG. 2.

In addition, it was explained above that the logical cell $C_{i,j}$ has to produce a second output signal at the second output terminal DISI+1 which indicates that either multiplexer MUXi has to select its j'th input (this is so when CS is high) or one of the multiplexers with index below I has to select the nibble applied to the j'th terminal of MUXi (this is so when DISI is high). In all these circumstances, DISI+1 has to be high. FIG. 4 shows the state diagram wherein this is realized. From this state diagram, one can deduce that:

$$DISI + 1 = DISI + ENIJ \cdot CB$$
$$= DISI + ENIJ \cdot CB \cdot \overline{DISI}$$
$$= DISI + CS$$

Again a person skilled in the art of designing digital logic will recognize that this second output signal is generated at the output terminal DISI+1 in FIG. 2.

It is noticed that the working of the interfacing device INT according to the present invention is explained only by describing the operations of the functional blocks R, IRE SEL, CTRL, MUX, CR, MUX1 to MUXN and OR of FIG. 1 and the operations of the logical ports 1, 2, 3, and 4 in the cell $C_{i,j}$ drawn in FIG. 2. The contents of these functional blocks and logical ports on component level is not described in the present application since a person skilled in the art of designing and manufacturing electronic components obviously can derive from the above given functional description how embodiments of each of these blocks and ports can be realized. For evident reasons, the designers can choose the kind of logic (positive or negative) and technology (bipolar, MOSFET, . . . ) depending on the application of the interfacing device INT or the integration thereof with other devices.

Also a remark is that the logical cell $C_{i,j}$ to constitute the matrix in the control unit CTRL, is defined by the relations between the output signals, CS and DISI+1, and the input signals, DISI CB and ENIJ rather than by the structure of logical ports which realize these relations. A person skilled in the art of designing digital logic cells well-knows that the relations, defined by the state diagrams in FIG. 3 and FIG. 4, can be realize in many alternative ways by combining AND, OR, NAND, NOR and NOT ports. Since it is routine work for this person to design another logical cell $C_{i,j}$ realizing the same relations between input signals and output signals than the one drawn in FIG. 2, the scope of the present invention is not limited to any particular design of the contents of the cell $C_{i,j}$.

Yet another remark is that, although the above described embodiment of the interfacing device INT generates ATM cell headers on its output by replacing 4 nibbles in incoming ATM cell headers, the present invention is not limited to any particular value of N or M, or to any particular length of the incoming sets of bits (which is 4 bits for a nibble). Minor modifications of the above described embodiment of the interfacing device INT, enable it to be used for any other application wherein an incoming M-wide data stream has to replace parts of an outgoing N-wide data stream and wherein, eventually, a particular order in the incoming data stream has to be maintained in the outgoing data stream.

Furthermore, it should be noticed that it is not an absolute requirement of the present invention to apply incoming set 1 to an input terminal of MUX1, incoming sets 1 and 2 to the input terminals of MUX2, and so on. When doing so, as already explained above, a matrix of logical cells having the functionality of the cell $C_{i,j}$ drawn in FIG. 2 guarantees that the order of incoming sets of bits is respected by the outgoing sets of bits. It is however obvious that in an alternative embodiment of the interfacing device INT according to the present invention wherein the order of incoming sets of bits is reversed in the outgoing sets of bits, incoming set 1 has to be applied to an input of MUXN, incoming sets 1 and 2 have to be applied to the inputs of MUXN−1, and so on. Evidently, any other particular order in the outgoing sets of bits can be realized by selecting the incoming sets of bits that are applied to MUX1, MUX2, . . . , MUXN respectively in an appropriate way and by interconnecting the logical cells constituting the matrix in CTRL also in an appropriate way.

A further remark is that the selection means SEL autonomously may know which sets of bits have to be replaced in the N outgoing sets of bits since it is hardcoded in a memory thereof, or may be informed about this via a control channel CC as was the case for the above described embodiment.

While the principles of the invention have been described above in connection with specific apparatus, it is to be clearly understood that this description is made only by way of example and not as a limitation on the scope of the invention.

What is claimed is:

1. Interfacing device (INT) to be coupled between an incoming channel (IC) and an outgoing channel (OC) and to be used to replace M outgoing sets of bits out of N outgoing sets of bits (OS1, OS2, . . . , OSN) by M incoming sets of bits (IS1, IS2, . . . , ISM) received on said incoming channel (IC), M being an integer number smaller than N, said interfacing device (INT) comprising:

a. outgoing register means (OR) provided to temporarily store said N outgoing sets of bits (OS1, OS2, . . . , OSN); and
   b. selection means (SEL) coupled between said incoming channel (IC) and said outgoing register means (OR), and provided to select said M outgoing sets of bits out of said N outgoing sets of bits (OS1, OS2, . . . , OSN)

and to route said M incoming sets of bits (IS1, IS2, ..., ISM) to said outgoing register means (OR) to thereby replace said M outgoing sets of bits, wherein said selection means (SEL) further comprises:
c. a multiplexing unit (MUX) including N multiplexers (MUX1, MUX2, ..., MUXN), each multiplexer being related to an outgoing set of bits of said N outgoing sets of bits (OS1, OS2, ..., OSN), and having a control input, the multiplexer unit (MUX) having at most M input terminals adapted to sink at most M incoming sets of bits out of said M incoming sets of bits (IS1, IS2, ..., ISM), and one output terminal adapted to source one of said at most M incoming sets of bits under control of a control signal applied to said control input if said related outgoing set of bits has to be replaced; and
d. a control unit (CTRL) adapted to generate for said each multiplexer, said control signal and to apply said control signal via an output terminal of said control unit (CTRL) to said control input of said each multiplexer.

2. Interfacing device (INT) according to claim 1, wherein in reference to said incoming channel (IC) the following applies, a multiplexer with an index i amongst said N multiplexers (MUX1, MUX2, ..., MUXN) is equipped with input terminals structured to receive bits from the (IC) such that:
i input terminals if said index i has a value in the range from 1 to M, said i input terminals being adapted to respectively sink incoming sets of bits with indices 1 to i amongst said M incoming sets of bits (IS1, IS2, ..., ISM);
M input terminals if said index i has a value in the range of M+1 to N−M, said M input terminals being adapted to respectively sink said M incoming sets of bits (IS1, IS2, ..., ISM); and
N−i+1 input terminals if said index i has a value in the range of N−M+1 to N, said N−i+1 input terminals being adapted to respectively sink incoming sets of bits with indices M−N+i to M amongst said M incoming sets of bits (IS1, IS2, ..., ISM).

3. Interfacing device (INT) according to claim 1, wherein said control unit (CTRL) comprises a matrix of identical logical cells ($C_{1,1}$; ...; $C_{N,M}$), each logical cell being associated with one multiplexer of said N multiplexers (MUX1, MUX2, ..., MUXN) and with one input terminal of said at most M input terminals of said one multiplexer, and being adapted to generate a control signal indicating whether said output terminal of said one multiplexer has to source an incoming set of bits sunk by said one input terminal or not.

4. Interfacing device (INT) according to claim 3, wherein said each logical cell is equipped with three input terminals (CB, DISI, ENIJ) and two output terminals (CS, DISI+1) whereof:
a first input terminal (CB) is adapted to sink a signal indicating whether an outgoing set of bits related to said one multiplexer has to be replaced by one of said M incoming sets of bits (IS1, IS2, ..., ISM);
a second input terminal (DISI) is adapted to sink a signal indicating that an output terminal of another multiplexer than said one multiplexer has to source an incoming set of bits sunk by said one input terminal;
a third input terminal (ENIJ) is adapted to sink a signal indicating that said output terminal of said one multiplexer does not have to source an incoming set of bits sunk by another input terminal than said one input terminal;
a first output terminal (CS) is adapted to source said control signal; and
a second output terminal (DISI+1) is adapted to source a signal indicating that said output terminal of said one multiplexer or said another multiplexer sources said incoming set of bits sunk by said one input terminal.

5. Logical cell ($C_{i,j}$) to be used in a control unit (CTRL) of an interfacing device (INT) which replaces M outgoing sets of bits out of N outgoing sets of bits (OS1, OS2, ..., OSN) by M incoming sets of bits (IS1, IS2, ..., ISM), M being an integer number smaller than N, said logical cell ($C_{i,j}$) being adapted to generate a control signal for an associated multiplexer in said interfacing device (INT) with at most M input terminals adapted to sink at most M incoming sets of bits of said M incoming sets of bits (IS1, IS2, ..., ISM), said logical cell ($C_{i,j}$) being associated with one input terminal of said at most M input terminals and said control signal indicating whether an output terminal of said associated multiplexer has to source an incoming set of bits sunk by said one input terminal or not, said logical cell ($C_{i,j}$) being equipped with three input terminals (CB, DISI, ENIJ) and two output terminals (CS, DISI+1) whereof:
a first input terminal (CB) is adapted to sink a signal indicating whether an outgoing set of bits related to said associated multiplexer has to be replaced by one of said M incoming sets of bits (IS1, IS2, ..., ISM);
a second input terminal (DISI) is adapted to sink a signal indicating that an output terminal of another multiplexer than said associated multiplexer has to source an incoming set of bits sunk by said one input terminal;
a third input terminal (ENIJ) is adapted to sink a signal indicating that said output terminal of said associated multiplexer does not have to source an incoming set of bits sunk by another input terminal than said one input terminal;
a first output terminal (CS) is adapted to source said control signal; and
a second output terminal (DISI+1) is adapted to source a signal indicating that said output terminal of said associated multiplexer or said another multiplexer sources said incoming set of bits sunk by said one input terminal.

6. A control unit (CTRL) used to generate a control signal for each multiplexer of N multiplexers (MUX1, MUX2, ..., MUXN) in an interfacing-device (INT) which replaces M outgoing sets of bits out of N outgoing sets of bits (OS1, OS2, ..., OSN) by M incoming sets of bits (IS1, IS2, ..., ISM), M being an integer number smaller than N, said each multiplexer having at most M input terminals adapted to sink at most M incoming sets of bits of said M incoming sets of bits (IS1, IS2, ..., ISM), said control unit (CTRL) comprising a matrix of logical cells ($C_{1,1}$; ...; $C_{N,M}$), each logical cell ($C_{i,j}$) being associated with one multiplexer of said N multiplexers (MUX1, MUX2, ..., MUXN) and with one input terminal of said at most M input terminals of said one multiplexer, and adapted to generate a control signal indicating whether an output terminal of said one multiplexer has to source an incoming set of bits sunk by said one input terminal or not, said each logical cell ($C_{i,j}$) being equipped with three input terminals (CB, DISI, ENIJ) and two output terminals (CS, DISI+1) whereof:

a first input terminal (CB) is adapted to sink a signal indicating whether an outgoing set of bits related to said one multiplexer has to be replaced by one of said M incoming sets of bits (IS1, IS2, . . . , ISM);

a second input terminal (DISI) is adapted to sink a signal indicating that an output terminal of another multiplexer than said one multiplexer has to source said incoming set of bits sunk by said one input terminal;

a third input terminal (ENIJ) is adapted to sink a signal indicating that said output terminal of said one multiplexer does not have to source an incoming set of bits sunk by another input terminal than said one input terminal;

a first output terminal (CS) is adapted to source said control signal; and a second output terminal (DISI+1) is adapted to source a signal indicating that said output terminal of said one multiplexer or said another multiplexer sources said incoming set of bits sunk by said one input terminal.

\* \* \* \* \*

UNITED STATES PATENT AND TRADEMARK OFFICE
CERTIFICATE OF CORRECTION

PATENT NO : 6,111,899
DATED : August 29, 2000
INVENTOR(S): Stefaan Margriet Albert Van Hoogenbemt It is certified that error appears in the above-identified patent and that said Letters Patent are hereby corrected as shown below:

At column 12, line 49 (claim 6, line 3), delete "interfacing-device" and substitute --interfacing device--.

Signed and Sealed this

Twenty-fourth Day of April, 2001

Attest:

NICHOLAS P. GODICI

*Attesting Officer*     *Acting Director of the United States Patent and Trademark Office*